United States Patent [19]

Cohen

[11] 4,296,838
[45] Oct. 27, 1981

[54] AUTOMOTIVE OIL SYSTEM

[76] Inventor: Merrill L. Cohen, 222 Summer St., Worcester, Mass. 01608

[21] Appl. No.: 61,507

[22] Filed: Jul. 27, 1979

[51] Int. Cl.³ .................. B65D 85/00; F16N 31/00
[52] U.S. Cl. .................................. 184/106; 141/98; 184/1.5; 206/223; 215/6; 220/1 C
[58] Field of Search ............ 184/1.5, 106; 220/1 C; 215/1 C, 6; 206/223, 216, 504; 141/98, 338

[56] References Cited

U.S. PATENT DOCUMENTS

| | | | |
|---|---|---|---|
| Re. 27,449 | 8/1972 | Bortz | 184/106 X |
| 132,020 | 10/1872 | Odell | 215/6 |
| 200,065 | 2/1878 | Kloczewski et al. | 215/6 |
| 255,642 | 3/1882 | Lubin | 215/6 X |
| 825,680 | 7/1906 | Raymond | 215/6 |
| 2,326,414 | 8/1943 | Thompson | 215/6 X |
| 2,362,223 | 11/1944 | Platkin | 215/6 |
| 3,474,949 | 10/1969 | Shine | 206/216 X |
| 4,010,863 | 3/1977 | Ebel | 220/1 C |
| 4,114,660 | 9/1978 | Arruda | 184/106 X |

FOREIGN PATENT DOCUMENTS

| | | | |
|---|---|---|---|
| 2115693 | 10/1972 | Fed. Rep. of Germany | 206/504 |
| 2233858 | 1/1974 | Fed. Rep. of Germany | 206/216 |
| 2351932 | 4/1975 | Fed. Rep. of Germany | 184/106 |
| 1416096 | 12/1975 | United Kingdom | 184/106 |

Primary Examiner—David H. Brown
Attorney, Agent, or Firm—Norman S. Blodgett; Gerry A. Blodgett

[57] ABSTRACT

System for changing motor oil, consisting of two related containers, one to receive used oil drained from the vehicle, and the other carrying new oil for introduction into the vehicle.

7 Claims, 9 Drawing Figures

AUTOMOTIVE OIL SYSTEM

BACKGROUND OF THE INVENTION

One of the disconcerting problems of modern life is the difficulty of disposing of used motor oil. One procedure that is often used is to place the old motor oil in the container from which the new motor oil has been removed. In order to do this, however, it is necessary to first pour the new oil from the container into a secondary container, after which the used oil is drained into the first container. Another possible method is to drain the old oil into a secondary container and, after the new oil has been introduced into the engine, to pour the old oil from the secondary container into the original new oil container. In either case, an extra container is necessary and this, of course, becomes coated with oil, so that the procedure becomes rather messy. In a commercial filling station, when the oil is changed a large reservoir is available to receive the used motor oil and this particular problem is not encountered. It is only when the individual consumer chooses to change his oil personally that this problem is encountered. Even when one is willing to tolerate this messy procedure, it is still difficult to direct the used motor oil from the crankcase into a small opening in an oil can or jug. These difficulties experienced with the prior art devices have been obviated in a novel manner by the present invention.

It is, therefore, an outstanding object of the invention to provide an automotive oil system which permits changing of oil without the soiling of one's hands or clothing.

Another object of this invention is the provision of an oil sales package of a compact and attractive nature.

A further object of the present invention is the provision of an oil changing system which is simple in construction and inexpensive to manufacture.

It is another object of the instant invention to provide a system for the sale and change of motor oil.

With these and other objects in view, as will be apparent to those skilled in the art, the invention resides in the combination of parts set forth in the specification and covered by the claims appended hereto.

SUMMARY OF THE INVENTION

In general, the invention consists of an automotive oil system having a container of new oil with a pouring spout and a container for receiving used oil with an admission opening. A first means is provided for holding the containers together before use and a second means is provided for holding the containers together after use. A closure is provided not only for the pouring spout, but also for the admission opening in the container for used oil.

More specifically, both containers are relatively thin and broad. The first means includes a socket on one container and a peg on the other, these serving to hold the containers together before use. The container for the oil is provided with a broad, inwardly-directed recess and the new oil container has an outwardly-directed protuberance that fits snugly in the recess to lock the containers together after use. The containers are joined by a hinge strap that permits one container to swing relative to the other from a first position (in which the containers are side-by-side) to a second position in which they are in an open end-to-end relationship.

BRIEF DESCRIPTION OF THE DRAWINGS

The character of the invention, however, may be best understood by reference to one of its structural forms, as illustrated by the accompanying drawings, in which.

DESCRIPTION OF THE PREFERRED EMBODIMENT

Figure 1:
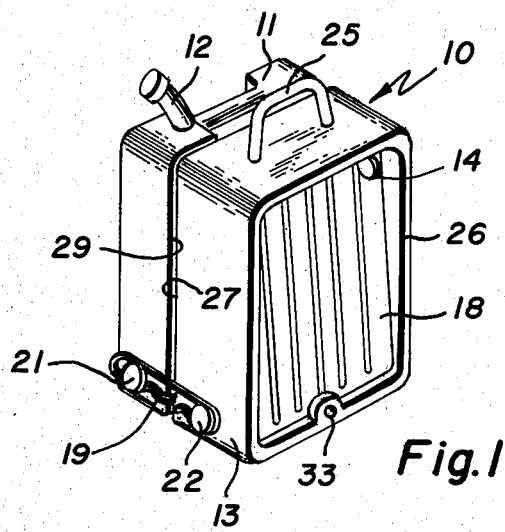
FIG. 1 is a perspective view of an automotive oil system incorporating the principles of the present invention.
Figure 2:
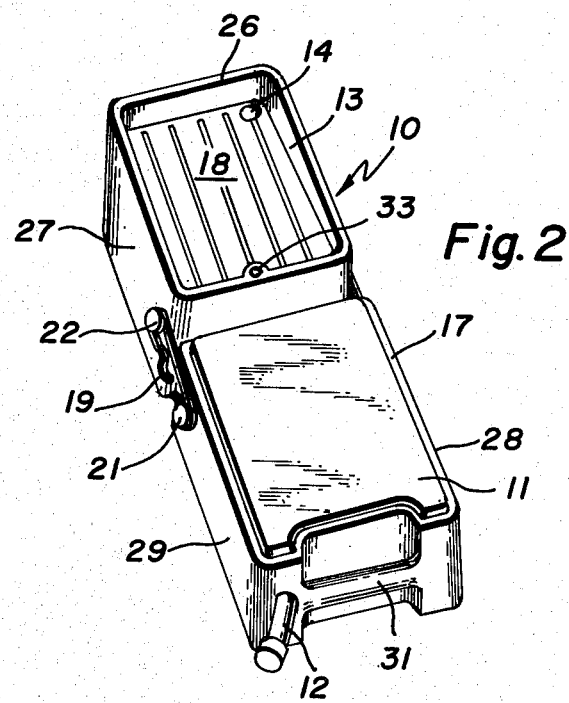
FIG. 2 is a perspective view of the system shown in open condition.

Referring first to FIGS. 1 and 2, which best show the general features of the invention, the automotive oil system, indicated generally by the reference numeral 10, is shown as consisting of a new oil container 11 having a pouring spout 12 and a container for used oil 13 having an admission opening 14. A first means is provided, consisting of a peg 15 (See FIG. 3) with a resilient sealing band on the container 11 and a socket 16 on the container 13 (See FIG. 8) that assists in holding the two containers together before use in the condition shown in FIG. 1. A second means, consisting of the peg 15 on the container 11 and the opening 14 on the container 13, serve to hold the containers together after use with the opposite sides in engagement. In this condition, the peg 15 fits snugly in the admission opening 14 to seal it.

The containers are joined by removable hinge straps 19 on each side which permit the containers to swing relative to each other from the first position (shown in FIG. 1.) in which the containers are side-by-side to a second position in which they are in open, end-to-end, coplanar relationship (as shown in FIG. 2). One of the straps 19 extends between a headed knob 21 on the new oil container 11 to a similar knob 22 on container 13 for used oil. On the other side, a similar strap 19 connects a knob 23 on the container 11 to a knob 24 on a container 13. The container 13 is provided with integral handle 25 on the end opposite the knobs 22 and 24.

Figure 3:
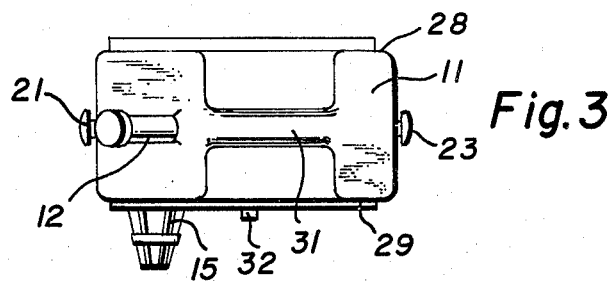
FIGS. 3, 4, and 5 are a plan view, a front elevational view, and a side elevational view, respectively, of a container forming part of the oil system.
Figure 4:
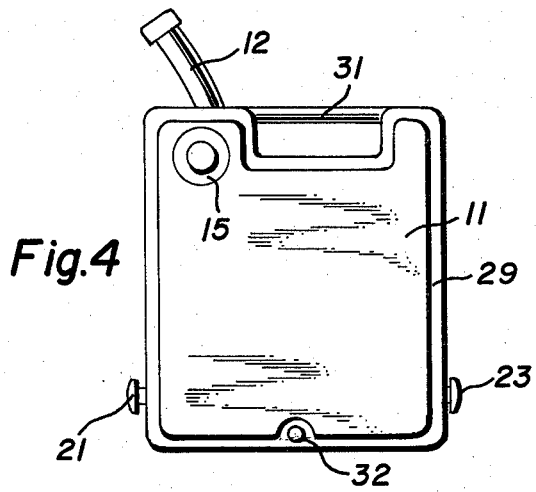
Figure 5:
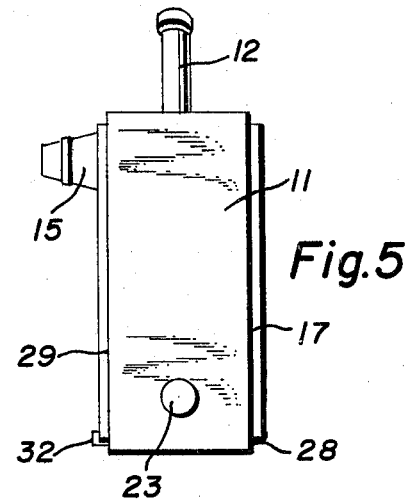
Figure 6:
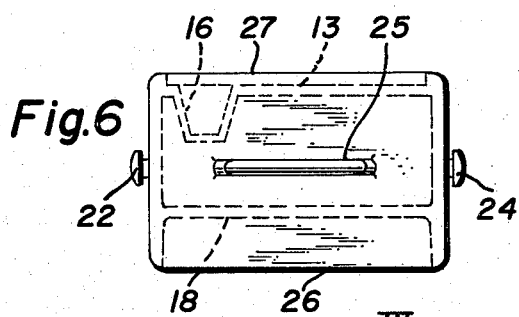
FIGS. 6, 7, and 8 are a plan view, a front elevational view, and a side elevational view, respectively, of another container forming part of the system.
Figure 9:
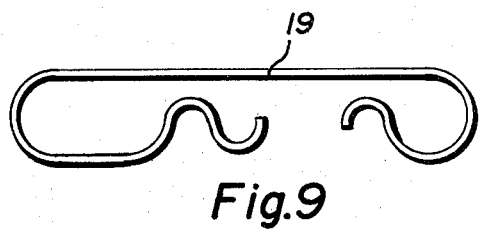
FIG. 9 is a front elevational view of a clip forming part of the invention.
Figure 7:
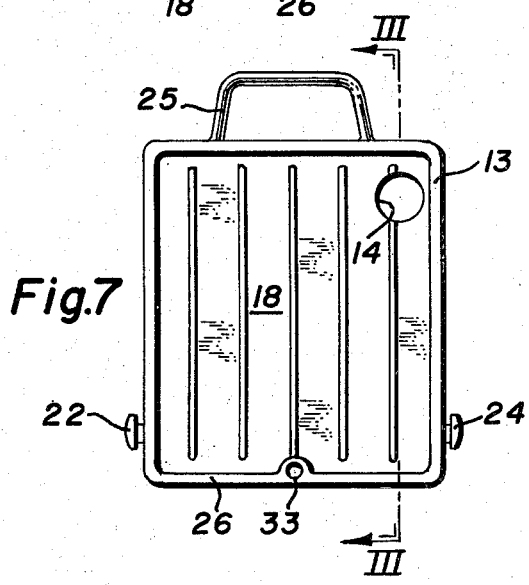
Figure 8:
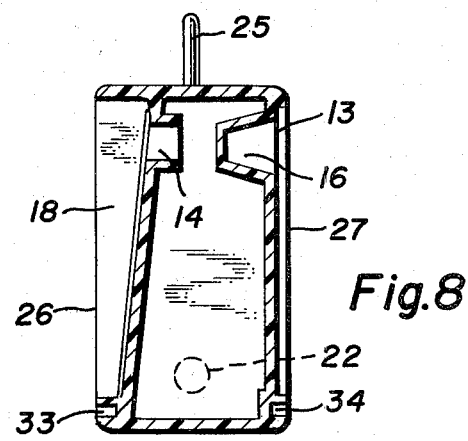

As shown in FIG. 3, the new oil container 11 has a generally flat configuration that is defined by two broad, spaced, parallel walls 28 and 29. The old oil container 13 (whose details are shown in FIGS. 6, 7, and 8) is generally similar in form to the new oil container and has two broad walls 26 and 27. In the preferred embodiment, the containers 11 and 13 are provided with means hinging them together at one extremity and means holding them together spaced substantially from that extremity. The pouring nozzle 12 and integral handle 25 are formed on the containers at the extremity opposite the hinged extremity. A small peg 32 rests in a recess 34 (See FIG. 8) in the first position and locks in a similar recess 33 in the second position.

The operation and advantages of the present invention will be readily understood in view of the above description. The automotive oil system 10 would be purchased by the consumer in the condition shown in FIG. 1. At that time, the new oil container 11 would contain new oil and the nozzle 12 would carry a cap to close it off. Since it is first necessary to remove the used oil from the engine, the consumer would spread the containers and place them in the open, coplanar condition shown in FIG. 2. The containers would be placed with the wall 26 of the container 13 facing upwardly and the wall 28 of the container 11 also facing upwardly. In this condition the recess 18 in the container 13 faces upwardly and the protuberance 17 of the container 11 faces upwardly. The drain plug is removed from the oil pan of the automobile and the oil is caused to flow into the recess 18 where it flows because of slope of the recess 18) into the admission opening 14. After the oil has been completely drained out, the containers are pulled from beneath the automobile by means of a recessed handle 31 which is integrally formed in the container 11. The container 11 is then removed from the container 13 and the cap is then removed from the nozzle 12 and the new oil is poured into the engine, presumably by pouring it in the usual way down the oil-receiving vent pipe. The handle 31 is suitably recessed below the level of the upper surface of the container 11, so that it will not interfere with the pouring operation by engaging protruding parts of the engine. Once the new oil has been poured into the automobile, the automotive oil system 10 now consists of a new oil container 11 (which is empty) and a container 13 (which is now full of used oil) which need to be disposed of. The peg 15 is firmly pressed into the opening 14, thus sealing the container and sealing the used oil within the container 13. The additional peg 32 may be used in connection with the recess 33 to further insure that the containers are held together. Also, the leakage of used oil is further prevented by a close interlocking of the protrusion 29 of the container 11 with the recess 18 of the container 13. The assembly is easy to carry and is relatively clean, if the user has been careful. He can now transport the container with its oil to a suitable place. He may, for instance, take it to a gasoline station for disposal in their sump. At some time in the near future, also, there may be a public oil dump receptacles for such disposal, since oil is too precious a resource to dispose of by the present methods.

It can be seen then, that, by use of the present invention, two containers start out face-to-face in the first condition shown in FIG. 1 with the surfaces 27 and 29 in contact, is used in the open second condition shown in FIG. 2, and finally, is later re-assembled into the third finished condition, in which the surfaces 26 and 29 are in contact. In the first condition, the peg 15 fits tightly into the recess 16 and holds them together in sealing relationship. In the second condition, the peg 15 fits tightly into the opening 14. In addition, the small peg 32 locks alternatively, in the recess 34 or the recess 33. Additional means, such as heavy paper band may be placed around the containers to assure that they do not separate during shipment and display. The hinge straps 19 are removable, so that the container 11 of new oil can be separated from the container 13 while pouring new oil into the engine. Otherwise, the consumer would be forced to lift two heavy, awkward containers, both full of oil (new and used).

It is obvious that minor changes may be made in the form and construction of the invention without departing from the material spirit thereof. It is now, however, desired to confine the invention to the exact form herein shown and described, but it is desired to include all such as properly come within the scope claimed.

I claim:

1. Automotive oil system, comprising:
   (a) a new oil container having a pouring spout,
   (b) a container for used oil having an admission opening,
   (c) first means holding the two containers together before use, and
   (d) second means holding the containers together after use, including a closure for the admission opening in the container for used oil.

2. Automotive oil system as recited in claim 1, wherein both containers are relatively thin and broad and the first means is a socket on one container and a peg on the other container holding them together before use.

3. Automotive oil system as recited in claim 1, wherein the container for used oil is provided with a broad, inwardly-directed recess and the new oil container has an outwardly-directed protuberance that fits snugly in the said recess to lock the containers together after use.

4. Automotive oil system as recited in claim 3, wherein the containers are joined by a hinged strap that permits one container to swing relative to the other from a first position in which the containers are side-by-side to a second position in which they are in open, end-to-end relationship.

5. Automotive oil system as recited in claim 4, wherein one of the containers is provided with an integral handle.

6. Automotive oil system, comprising:
   (a) an oil container for used oil having a generally-flat configuration defined by two broad, spaced parallel walls, one of the walls having a broad shallow recess,
   (b) a new oil container having a form which is generally similar to that of the container for used oil and having two broad walls, one of the walls being formed with a protuberance,
   (c) a pouring nozzle formed on the new oil container, and
   (d) a receiving opening formed on the old oil container, the opening receiving the said protuberance in a snugly-fitting manner.

7. Automotive oil system as recited in claim 6, wherein the containers are provided with means hinging them together at one extremity and means holding them together spaced substantially from the said extremity, an integral handle being formed on each of the containers at the other extremity.

\* \* \* \* \*